Patented Feb. 10, 1948

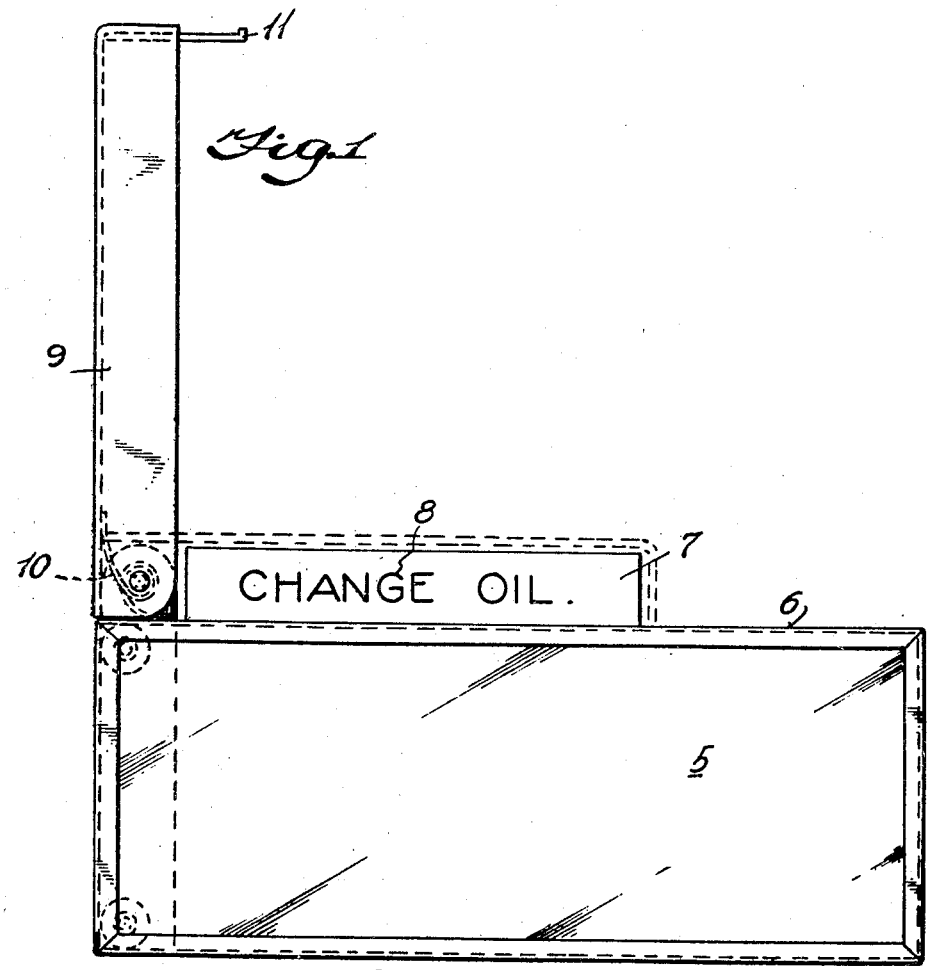
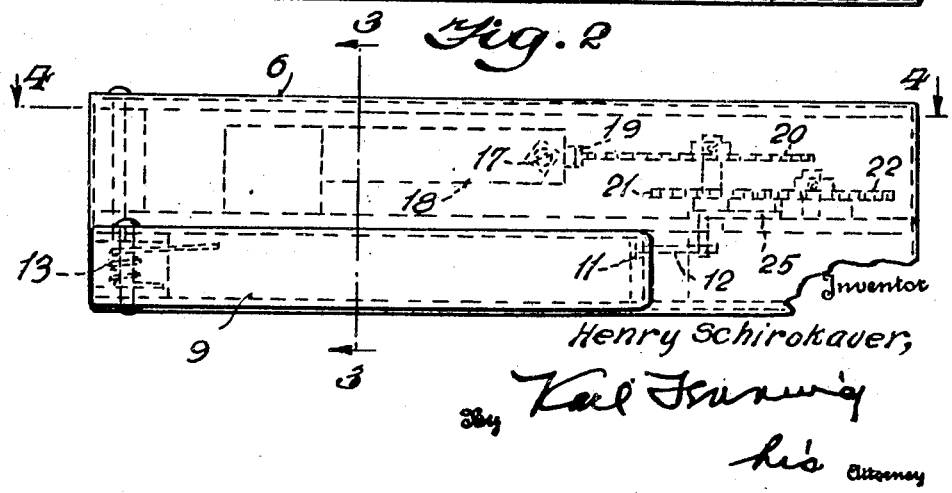

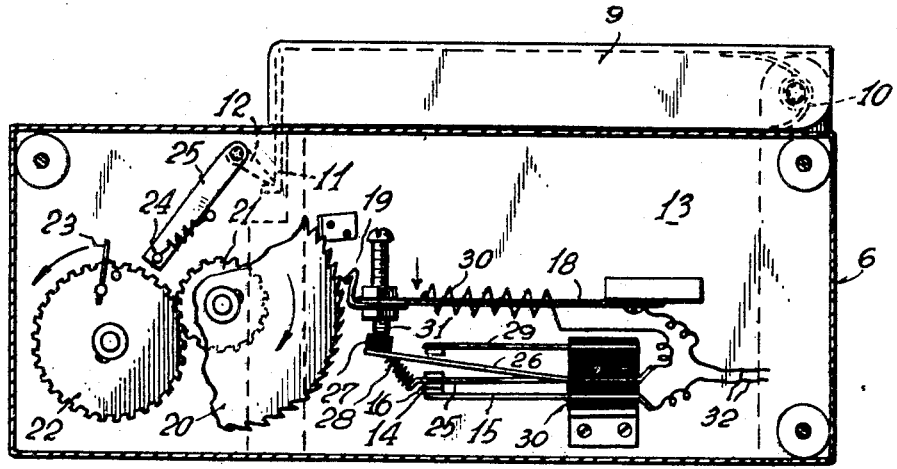
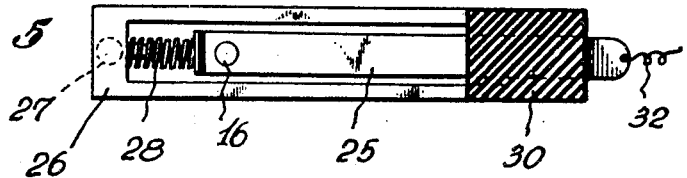
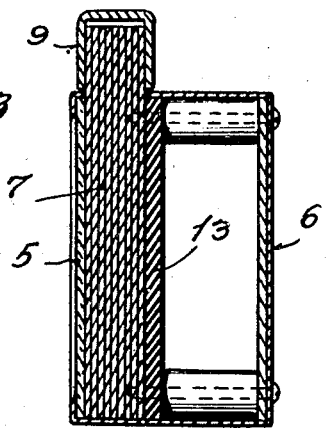

2,435,907

UNITED STATES PATENT OFFICE 2,435,907

SERVICE INDICATOR

Henry Schirokauer, New York, N. Y., now by change of name Henry Allan Sherwood

Application October 17, 1945, Serial No. 622,741

6 Claims. (Cl. 177—311)

This invention relates to a device for opening and closing an electric circuit and causing reciprocation of a device by the circuit. It may be especially useful for installation on an automobile to aid the operator in knowing when certain attentions should be given to the automobile and its parts to keep it in proper running order. It may be desirable to supply oil to the motor periodically; it may be desirable to inspect and add water to the battery to make other similar service operations. To this end cards may be provided bearing legends indicating to the operator that the time has come for performing the service operations. These cards may be brought to the attention of the operator at the proper times. To this end the invention contemplates putting such cards in a closed box in such position that when the box is opened the cards will be visible and attract the attention of the operator. A convenient place to put the cards may be at the rear sight mirror. The time for display of the cards may be controlled by some such device as a bi-metallic thermal element which may be heated by current from the automobile generator when the engine is operating. This may be arranged to open and shut its own circuit as it heats and cools and thus after a certain time of motor operation may cause a cover or concealing member on the box to be displaced to disclose to view the indicator cards.

One form the invention may take is disclosed in the accompanying drawings in which Figure 1 is a front elevation of the device. Fig. 2 is a top plan view. Fig. 3 is a transverse vertical section on the line 3—3 of Fig. 2. Fig. 4 is a rear elevation with the rear frame cover removed. Fig. 5 a fragmentary detail of a portion of the mechanism.

At the rear of a rear sight mirror 5 placed before the driver of an automobile may be a box or receptacle 6 in which may be carried cards 7 having various legends 8 especially toward their top edges which may project above the edge of the mirror and be conspicuously visible to the operator of the automobile as indicated in Fig. 1. A cover 9 is biased to open position shown in full lines in Fig. 1, by a spring 10 and provided with a catch 11 to hold it in closed position shown in dotted lines in Fig. 1 so as to cover and conceal the cards 7. A latch 12 carried on the front of an inner wall 13 engages the catch 11.

Mounted on the rear side of the wall 13 may be a switch contact 14 carried by a more or less rigid member 15 which cooperates with a switch contact member 16 carried by a resilient strip 25 which is shown within the arms of a resilient strip 26 which carries a lug 27 connected by a coil spring 28 with the end of the strip 25 (see Fig. 5). Here may also be provided a stopping strip 29 which is mounted in an insulating block 30 which also holds the strips 15, 25, and 26 so that they are insulated from each other. A bimetallic element 18 may be provided with a coil 30 and have on its end an adjustable lug 31 to engage the lug 27.

With the apparatus in the normal or not operating position shown in Fig. 4 current will flow from the generator of an automobile (not shown) through the connections 32, when the motor is operating, through the strip 15, the contacts 14 and 16, the strip 25 and the coil 30 thus heating the bimetallic element 18 which curves or bends so as to press downwardly the lug 31 carried by it. This movement causes the point where the spring 28 is connected to the strip 26 to come below the end of the strip 25 and at the same time compresses the spring 28 between its two connecting points. Thus the expanding force of the spring 28 forces up the end of the strip 25 and opens the circuit by forcing apart the contacts 14 and 16. Current thus ceases to flow through the coil 30 and the bimetallic element resumes the position shown in Fig. 4, allowing the lug 27 to be restored to its normal position to put the pressure of the spring 28 downward on the end of the strip 25 to close the contacts 14 and 16 and start a new heating and moving operation. Thus there is a repeated upward and downward movement to the end of the bimetallic element.

Also carried by the bimetallic member 18 is a pawl 19 which on the downward movement of the member 18 engages the ratchet wheel 20 and moves it step by step. The shaft of the wheel 20 carries a toothed wheel 21 engaging and driving a second toothed wheel 22 which carries a preferably flexible arm 23 arranged as the gear 22 rotates to rise under and lift a pin 24 on a springheld pivoted arm 25 carrying the latch 12 which thus moves and releases the cover 9 to open and expose the cards 7.

The exposed card may then be seen and removed and the indicated service attended to. The cards may be variously inscribed or printed so as to give the desired service instructions. When the motor has run a certain time it may be desired to change the oil while after it has run a further amount other services may be needed and the cards may be properly arranged after each exposure so as to put at the front of the pack the card bearing the instruction warning next needed. The device is thus controlled by current from the automobile generator and expose the instruction cards after appropriate periods of generator operation.

The specific details of mechanism are not essential to the invention which may be embodied in other arrangements of appropriate apparatus for the same or other purposes.

I claim as my invention:

1. In an automobile service indicator, a bimetallic thermal strip heated by an electric circuit and mounted behind the rear sight mirror, a switch in the circuit opened by movement of the strip when it becomes heated and closed when it becomes cool, a pawl carried by the strip and moving when the strip becomes heated, a toothed wheel engaged by and moved by the pawl, a pocket containing service indicating cards behind the mirror, a cover for the pocket, and means actuated by the wheel for opening the cover.

2. In an automobile service indicator, a bimetallic thermal strip heated by an electric circuit and mounted behind the rear sight mirror, a switch in the circuit opened by movement of the strip when it becomes heated and closed when it becomes cool, a closed pocket containing service indicating cards behind the mirror, and means actuated step by step by the strip for exposing the cards.

3. In a service indicator, a bimetallic thermal strip heated by an electric circuit, a switch in the circuit opened by movement of the strip when it becomes heated and closed when it becomes cool, a pocket containing service indicating cards, a cover for the pocket, a spring for opening the cover, a lock for holding the cover closed, and means actuated step by step by the strip for releasing the lock.

4. In a service indicator, a bimetallic thermal strip, an electric circuit for heating the strip, a switch in the circuit opened by movement of the strip when it becomes heated and closed when it becomes cool, a pawl carried by the strip and moving when the strip becomes heated, a toothed wheel engaged by and moved by the pawl, a pocket containing service indicating cards, a cover for the pocket, a spring for opening the cover, a lock for holding the cover closed, and means actuated by the wheel for releasing the lock.

5. In an automobile service indicator, a bimetallic thermal strip heated by an electric circuit and mounted behind the rear sight mirror, a switch in the circuit opened by movement of the strip when it becomes heated and closed when it becomes cool, a pocket behind the rear sight mirror, service indicating cards in the pocket, and means actuated step by step by the bimetallic strip for exposing a card.

6. In a service indicator, a bimetallic thermal strip heated by an electric circuit, a switch in the circuit opened by movement of the strip when it becomes heated and closed when it becomes cool, a pocket, service indicating cards in the pocket, spring means for exposing a card, and means actuated step by step by the bimetallic strip for releasing the spring for operation.

HENRY SCHIROKAUER.

REFERENCES CITED

The following references are of record in the file of this patent:

UNITED STATES PATENTS

| Number | Name | Date |
|---|---|---|
| 1,404,295 | Horvitz | Jan. 24, 1922 |
| 1,564,583 | Koudriavzeff et al. | Dec. 8, 1925 |
| 1,780,673 | Eaton | Nov. 4, 1930 |
| 1,881,884 | Noble | Oct. 11, 1932 |
| 2,399,171 | Davis | Apr. 30, 1946 |